United States Patent [19]

Arnason

[11] 4,187,274
[45] Feb. 5, 1980

[54] METHOD FOR FORMING SHEETS HAVING REDUCED SURFACE IMPERFECTIONS

[75] Inventor: Sigurdur I. Arnason, Fenwick, Mich.

[73] Assignee: The General Tire & Rubber Company, Akron, Ohio

[21] Appl. No.: 945,930

[22] Filed: Sep. 26, 1978

Related U.S. Application Data

[63] Continuation of Ser. No. 801,709, May 31, 1977, abandoned.

[51] Int. Cl.² ............................................. B29G 1/00
[52] U.S. Cl. .................... 264/325; 425/406; 264/293
[58] Field of Search ............... 264/293, 325; 425/394, 425/406, 408, 411, 412

[56] References Cited

U.S. PATENT DOCUMENTS

| 3,466,259 | 9/1969 | Jernigan | 260/37 |
| 3,548,030 | 12/1970 | Jernigan | 260/836 |
| 3,577,478 | 5/1971 | Thorpe | 260/862 |
| 3,674,893 | 7/1972 | Nowak et al. | 260/836 |
| 3,701,748 | 10/1972 | Kroekel | 260/40 R |
| 3,772,241 | 11/1973 | Kroekel | 260/40 R |

FOREIGN PATENT DOCUMENTS

1132319 6/1962 Fed. Rep. of Germany ........... 425/542

Primary Examiner—J. Howard Flint, Jr.

[57] ABSTRACT

A mold for compression molding a plastic sheet from a viscous fluid provides more resistance to flow on the side of the sheet designed to be the underside than on the side of the sheet designed to be seen. This resistance to flow can be imparted by roughening the underside of the mold more than the top surface of the mold. The purpose for roughening one surface of the mold more than the other is so that the plastic mass will flow faster on the smoother side of the mold and carry bubbles to the rough side of the mold via a rolling action. By this method employing textured molds, the surface of automotive panels can be made having reduced surface imperfections.

1 Claim, 5 Drawing Figures

METHOD FOR FORMING SHEETS HAVING REDUCED SURFACE IMPERFECTIONS

This is a continuation of application Ser. No. 801,709 filed May 31, 1977, now abandoned.

BACKGROUND OF THE INVENTION

1. Field of the Invention

This invention is directed to a method of using textured molds, more particularly to using molds which cause a rolling-over during flow of the plastic being molded so that bubbles are carried to the back non-visable side of the sheet being molded.

2. Description of the Prior Art

In the molding of viscous plastic material to form sheets used as body panels and the like, it has become standard practice to polish dies to the highest gloss obtainable. The high polish was imparted to minimize surface irregularities. The polished die was an out growth of the development of SMC that more accurately reproduced the exact surface of the mold. Unfortunately, the highly polished dies did not accomplish the desired end result. Sheets produced using the highly polished dies still contained significant porosity, noticeable waves and sinks, fiber patterns visable on the surface, orange peel on the finished part and visable flow lines.

The material most commonly used in the compression molding of body panels has been low profile sheet molding compound (SMC). SMC is a compound consisting of polyester resin, fillers, catalysts, chopped glass strands, release agents and a low profile additive that expands during the curing reaction.

SMC has been described in U.S. Pat. Nos. 3,701,748; 3,772,241; 3,674,893, 3,577,478, 3,548,030 and 3,466,259.

SMC has gained widespread use in the automotive industry as a molding compound for exterior vehicle parts due to (a) low cost, (b) ability to form large parts, and (c) ability to mold in ribs and bosses for fastening.

A persistent problem, however, has been apparent porosity and fiber prominence on the surface. These defects show up after the first application of primer and result in extensive reworking and repainting of the part. It has become a prior art standard practice in tooling for SMC to polish dies to the highest gloss obtainable to obtain an absolutely smooth flat surface.

The reason that the automotive industry has switched to body panels made from plastic sheet recently on a massive scale, has been to reduce weight, and thus, improve fuel efficiency. One benefit to the consumer was body panels that did not rust through in a year or two in northern climates where roads are salted. Other benefits included elimination of rattling noises generated by metal-to-metal contact. One difficulty with the plastic body panels has been the problem of producing a surface free of visable imperfections without a subsequent sanding operation.

To produce such a surface on an automotive panel it has been necessary, in the past, to extensively smooth the surface of panels having imperfections with sandpaper. This generates dust, often requiring the laborers doing the job to wear respirator masks. This is quite uncomfortable on hot days near the hot curing presses.

Before the development of the present invention, raised areas were welded onto the vertical backside of a grill opening panel mold and the panels produced were sold more than one year prior to the present application date.

SUMMARY OF THE INVENTION

It has been unexpectedly discovered that if the surface of the mold forming the less visable surface of the part produced is abraded to form a surface more resistant to flow than the abraded surface of the mold forming the visable surface of the part, that a rolling action of the viscous plastic mass occurs. The rolling action facilitates the release of air bubbles trapped in SMC sheet allowing said air to escape out through the shear edge and carries the air trapped in the viscous plastic to the less visable surface of the part and away from the visable surface.

The applicant has theorized that the rolling action of the flowing plastic carries air bubbles to the less visable side of the part, but does not intend to be bound by this theory. It is only known that the method of the present invention is operative to overcome the problems of the prior art and it is quite possible that the scientific reasons for the success, is not clearly understood. It is known that surface porosity, the big problem of the prior art, has been greatly reduced by the present invention. In addition:

(1) waves and sinks are shallower and less noticeable (2) no fiber pattern is apparent on the surface, resulting in a smoother finish after painting;

(3) surface irregularities of the paint is eliminated, due to the formation of a rough surface that tends to create valleys and ridges, that hold paint during flash-off of the solvent; and (4) due to retardation of material flow at the surfaces of the mold and subsequent interlaminous flow, flow lines are less noticeable and parts are stronger at the flow line.

The size and depth of the abrasion is dependent on mold configuration, placement of charge in die (core or cavity charged) and whether ribs and bosses are situated so as to impede the flow on one surface more than the other. Treatment consists of abrading the surfaces of the molds with an abrasive that will impart the desired texture to each individual mold surface or part of each mold surface. Materials which may be used to impart the desired texture includes aluminum oxide, glass beads, sand and metal grit. The particles of the texturing material can be from 40 to 250 mesh.

Each mold surface is treated so that speed of material flow across the mold surface will be faster on the more visable surface of the part relative to the less visable surface of the part. This difference in rate of flow causes a rolling motion of the glass fibers over the rough surface, retarding flow and allowing air to escape out of material during flow and to be entrapped on the less visable surface.

A glass smooth mold surface results in material tending to slide in globs over the hot mold surface allowing air to be entrapped at the top surface and flow lines to become apparent due to a front of melted resin. When molds are textured as above, the dimples fill with resin preventing fibers from being prominent on the surface and ensuring a homogenous mix of materials at the flow lines, resulting in stronger parts.

A part having a convex curved visable surface will have a coarse texture on the concave side and a fine texture on the convex side (see FIG. 1). If the concave side is the exposed side, both sides of the part preferably have the same texture (see FIG. 2). In effect, the texture is used to reverse, through resistance on one side of the part, the flow pattern of the material so that whatever air is enclosed in the part will be on the backside (see FIG. 3).

If an intermittent boss or rib is on a flat part that has a straight shear edge, a smoother path than the surrounding area should be created immediately between the boss or rib and the material supply (charge), to accelerate flow into this thicker area so that the entire front of the material flow reaches the shear edge simultaneously to avoid enclosing air (see FIG. 4).

BRIEF DESCRIPTION OF THE DRAWINGS

FIGS. 1 and 2 are simplified from actual practice merely to exemplify the present invention.

Details of the materials or process used in making sheet molding compounds form no part of the present invention and are disclosed in SPI Handbook of Technical and Engineering of Reinforced Plastics/Composites by J. Gilbert Mohr, et al, Second Edition, Copyright 1973 Van Nostrandt. In particular, see pages 175 through 242.

Generally speaking, SMC contains a mixture of an unsaturated polyester dissolved in styrene, peroxide, lubricant, fiberglass low profile additive, curing agent and filler. The fiberglass constitutes 15 to 60% of the mix by weight and preferably 22 to 35%. The fiberglass is 12 to 50 millimeters long and has a very small diameter. The polyester plus styrene usually constitutes about 15% by weight of the mix. The lubricant, e.g., zinc stearate and the peroxide are present in small amounts. A small amount of a thickener such as magnesium oxide may also be present. An impact modifier such as polymethyl methacrylate copolymer with methacrylic or acrylic acid can also be used. A combination impact modifier and low profile additive such as a butadienestyrene block copolymer may also be present.

DESCRIPTION OF THE PREFERRED EMBODIMENTS

Treatment of the mold surface includes any process which will roughen the mold surface by removing portions of the surface to form an irregular, rough surface. Such treatment includes the mechanical abrasion treatments discussed above, chemical and electrochemical etching as is known in the art, and electrical treatment such as electric arc or plasma treatment whereby material is removed from portions of the mold surface to form pits as is also known in the art. The desired texture can also be imparted to the mold surface by the initial casting of the mold, but this procedure is not preferred.

The process of the present invention is applicable to the molding of articles from viscous plastics. Such molding techniques include SMC techniques, bulk molding compound techniques and injection molding techniques including reaction injection molding. It is particularly suitable for the use of SMC in the manufacture of automotive body panels.

The viscous plastics can have a viscosity of from 1,000 to $10 \times 10^7$ centipoises. The preferred SMC has a viscosity of from $15 \times 10^6$ to $50 \times 10^6$ centipoises at room temperature.

The mold that can be used in the practice of the method of the present invention includes any of the well-known molds of the prior art. These are usually two-piece molds having a bottom section and a top mating section. The space between the two faces of the mold usually ranges from 3 millimeters to 12 millimeters disregarding reinforcing members. The area of mold surface in square centimeters ranges from 5,000 to $1 \times 10^{12}$ cm$^2$.

Figure 1:
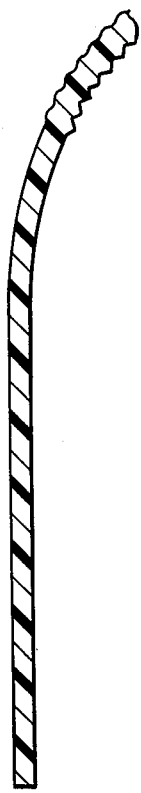
FIG. 1 is a drawing of a body panel having a coarse texture on the interior surface and a fine texture on the exterior surface. This texture was generated by the corresponding coarse and fine textures of the mold surface.
Figure 2:
FIG. 2 shows a body panel wherein the length (area) of the visable surface is greater than the length (area) of the interior surface. Both surfaces have a fine texture as do the two surfaces of the mold.
Figure 3:
FIG. 3 is a cross-section through the power dome of a Chrysler B-body front end. Again, it is seen that the exterior surface has a fine texture so that the plastic will flow faster along the fine textured surface while rolling over releasing entrapped air and carrying bubbles to the backside of the part which has a coarse texture.
Figure 3:
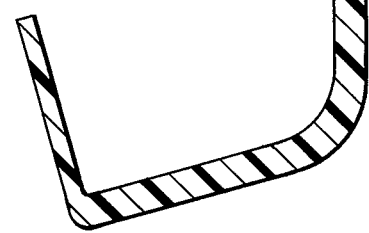
Figure 4:
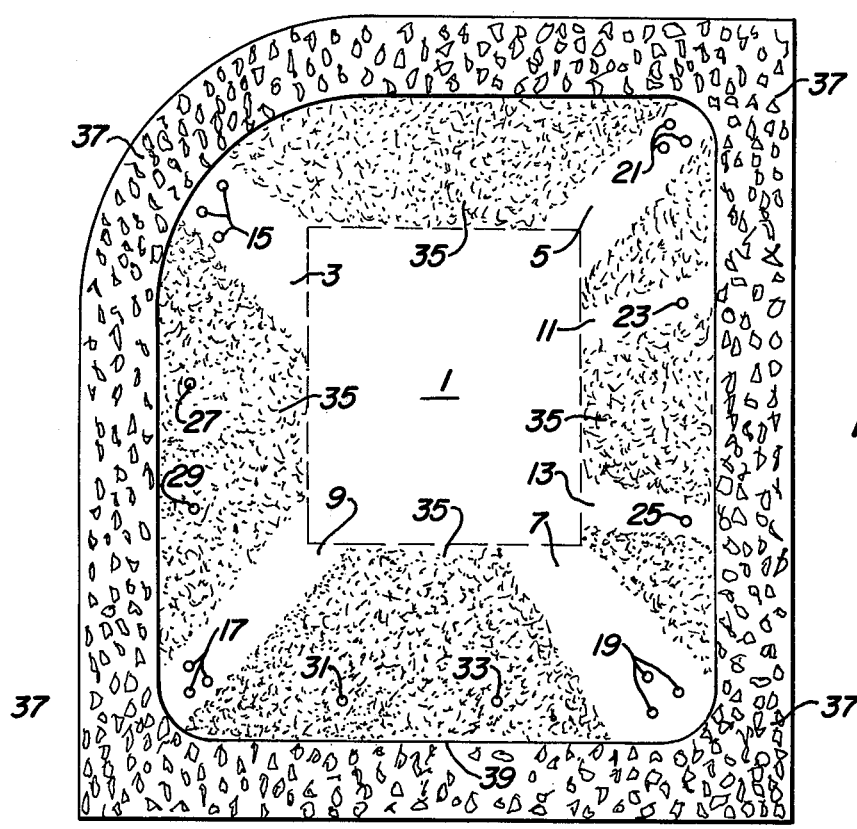
FIG. 4 shows the bottom side of a mold which forms the inside of a Corvette roof panel. Coarse patterns and smooth patterns in combination with boss recesses to slow down the surface flow of the viscous plastic are shown.
Figure 5:
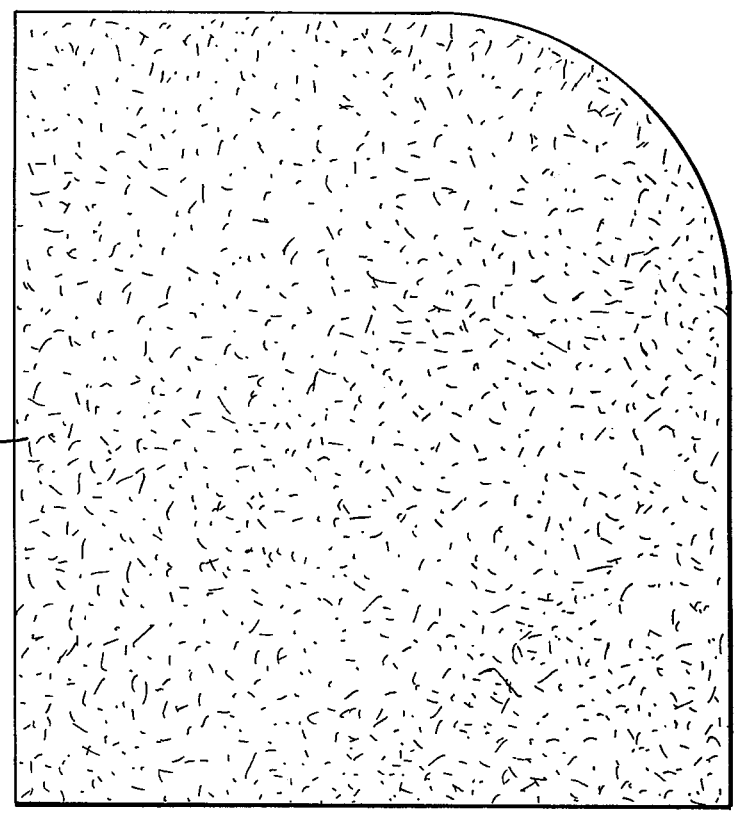
FIG. 5 shows the uniformly textured top (visable) side of a Corvette roof panel mold.

The following procedure has been used in manufacturing the removable roof section of the Corvette automobile. The bottom half of the mold used is shown in FIG. 4 and the top half of the mold used is shown in FIG. 5. A quantity of sheet molding compounds sufficient to completely fill the mold is placed in charge placement area 1 of FIG. 4. Areas 3, 5, 7, 9, 11 and 13 are relatively smooth areas which allow the sheet molding compound to flow freely to the mold recesses which form bosses. Bosses are shown at 15, 17, 19, 21, 23, 25, 27, 29, 31 and 33. The dotted areas 35 represent areas of the mold which have been textured by impingement, of glass beads against the mold. After the charge is placed, the mold is closed.

The area behind the bosses indicated by 37 are textured by 60 to 90 grit aluminum oxide to produce even a rougher surface in the area than 35 so as to slow down the flow of the sheet molding compound after it has entered the bosses. This slowing down of the travel of the SMC at the rougher surface allows the sheet molding compound at the upper mold surface to increase its speed relative to the lower surface, roll over and carry the bubbles which causes porosity to the lower surface.

FIG. 5 shows the upper mold surface which has a smoother texture 39 compared to the texture of the lower mold surface. The upper surface is textured by impingement with glass beads. Both the upper mold surface and the lower mold surface are heated in operation so as to cure the sheet molding compound. The surface of the mold of FIG. 5 has a uniform texture 39 which is less rough than the average texture of the mold surface of FIG. 4. Both the upper and lower mold surfaces are heated so as to cure the sheet molding compound to form the cured roof panel.

In the operation of the mold the upper mold half is brought down by hydraulic pressure against the sheet molding charge in the lower mold half. The pressure causes the charge to roll in the textured areas trapping porosity in the lower surface of the panel. The charge flows relatively free across the areas of the lower mold surface which is not textured to fill the cavity which form the bosses. After the filling of the bosses the remaining sheet molding material flows to the corner areas behind the bosses where, again, it is subjected to the rolling action which causes the porosity to be trapped on the bottom side of the panel.

The appropriate times and temperatures and other conditions utilized in the molding techniques are known in the art and also probably available from the Dow Chemical Company and the Rohm & Haas Company, two of the manufacturers of the resins used to make sheet molding compounds.

In addition to Corvette roof panels, the present invention has also been used to manufacture grill opening panels, camper roofs, automobile hoods, spoilers, and many other body parts.

I claim:

1. In a method for molding a thermosetting liquid having an initial viscosity of from 1,000 to $7 \times 10^7$ centipoises at room temperature filled with chopped glass fibers, into a cured sheet of material, which sheet in its final form has one visible surface and one surface which is less visible by:

(a) placing the glass fiber filled thermosetting liquid between two heated dies; and
(b) bringing the heated dies toward each other to cause the glass fiber filled thermosetting liquid to flow and fill the cavity formed by the dies and then set, wherein the improvement comprises:

a rougher surface on the die forming the less visible surface of the sheet than the surface of the die forming the more visible surface, wherein the rougher surface is rough enough to retard the flow of the compound more than the flow is retarded on the corresponding die surface forming the more visible surface, the rougher surface being rough enough to improve the paintability of the sheet produced but not so rough so as to impart a rough finish to the sheet after painting, the rougher surface being formed by the initial casting of the die surface or subsequent removal of material from the die surface by abrasion, etching, electric arc or plasma treatment.

* * * * *